United States Patent [19]

Bell

[11] Patent Number: 4,787,837

[45] Date of Patent: Nov. 29, 1988

[54] WEAR-RESISTANT CERAMIC, CERMET OR METALLIC EMBOSSING SURFACES, METHODS FOR PRODUCING SAME, METHODS OF EMBOSSING ARTICLES BY SAME AND NOVEL EMBOSSED ARTICLES

[75] Inventor: Norman D. Bell, Hazelcrest, Ill.

[73] Assignee: Union Carbide Corporation, Danbury, Conn.

[21] Appl. No.: 894,199

[22] Filed: Aug. 7, 1986

[51] Int. Cl.$^4$ .............................................. B28B 11/08
[52] U.S. Cl. .................................. 425/385; 264/284; 264/293
[58] Field of Search ....................... 264/284, 293, 338; 425/385

[56] References Cited

U.S. PATENT DOCUMENTS

| | | | |
|---|---|---|---|
| 2,662,002 | 12/1953 | Sunderhauf et al. | 41/43 |
| 2,714,563 | 8/1955 | Poorman et al. | 117/105 |
| 3,016,447 | 1/1962 | Gage et al. | 219/76 |
| 3,387,351 | 6/1968 | Roosen | 29/148.4 |
| 3,539,671 | 11/1970 | Nauta | 264/102 |
| 3,619,446 | 11/1971 | Nauta | 264/102 |
| 3,914,573 | 10/1975 | Muehlberger | 219/76 |
| 3,958,097 | 5/1976 | Fabel et al. | 219/76 |
| 4,105,491 | 8/1978 | Haase et al. | 156/553 |
| 4,116,594 | 9/1978 | Leanna et al. | 425/3 |
| 4,173,685 | 11/1979 | Weatherly | 428/556 |
| 4,250,135 | 2/1981 | Orsini | 264/227 |
| 4,280,978 | 7/1981 | Dannheim et al. | 264/156 |
| 4,478,769 | 10/1984 | Pricone et al. | 264/1.6 |
| 4,519,840 | 5/1985 | Jackson et al. | 106/1.05 |
| 4,551,297 | 11/1985 | Botcher et al. | 264/224 |
| 4,615,090 | 10/1986 | Baus | 425/385 X |

Primary Examiner—Charles Hart

Attorney, Agent, or Firm—James L. Sonntag

[57] ABSTRACT

Wear- and corrosion-resistant ceramic, cermet or metallic patterned embossing surfaces, e.g., as a coating bonded to an embossing roll, containing an average of 50 to 2,000 peaks per inch covering said patterned embossing surface. Also, methods of producing a patterned, wear-resistant embossing surface by bonding a ceramic, cermet or metallic coating to a patterned embossing surface, e.g., of an embossing roll, providing an average of about 50 to about 2,000 peaks on the external surface of said coating covering said embossing surface. In addition, methods of embossing articles having surfaces embossable by pressure contact to provide an embossed design and matte finish by pressure contacting the embossable surface with a ceramic, cermet or metallic embossing surface having an embossing pattern and an average of about 50 to 2,000 peaks covering said embossing pattern, wherein the embossed surface of said article is covered with an average of 50 to 2,000 indentations providing a matte finish; the range of gloss provided by the matte finishes produced by a number of similar ceramic, cermet or metallic embossing surfaces is much narrower than that provided by matte finishes produced by a number of similar conventional embossing surfaces; and the level of gloss resulting from use of ceramic, cermet or metallic embossing surfaces is much less dependent on line speed and temperatures of the embossing or embossable surfaces than gloss resulting from conventional embossing surfaces. Additionally, novel embossed articles produced by the novel embossing surfaces and processes are characterized by surprising increases in impact strength and scuff-resistance and a decrease in gloss.

9 Claims, No Drawings

WEAR-RESISTANT CERAMIC, CERMET OR METALLIC EMBOSSING SURFACES, METHODS FOR PRODUCING SAME, METHODS OF EMBOSSING ARTICLES BY SAME AND NOVEL EMBOSSED ARTICLES

BACKGROUND OF THE INVENTION

1. Field of the Invention

This invention relates to embossing surfaces for use in the plastic, textile, paper, aluminum, steel and other industries for applying embossed designs and matte finishes to embossable surfaces such as sheets of plastic, paper, textile or metals such as aluminum or steel. More particularly, this invention relates to embossing rolls and embossing tools useful for the manufacture of diverse embossed articles, including plastic or aluminum siding for buildings and mobile homes, ceiling and floor tiles, ceiling, floor and wall coverings, imitation leather, wearing apparel, upholstery materials, automotive dashboards and door panels, book coverings, aircraft cabin wall and ceiling panels, and the like.

2. Prior Art

Embossing is a method in which an embossable surface, e.g., the surface of a thermoplastic sheet, is textured with a pattern by forcing the sheet between two rolls (or other tooling), one of which has a three-dimensional pattern on its surface which is the mirror image of the pattern desired on the thermoplastic sheet. Requirements for the embossing roll (i.e., the roll with the three dimensional pattern imposed on its surface) include (a) the ability to create a repeatable, controlled surface texture tailored to the particular product requirements, (b) adequate mating characteristics vs. the backup roll (or other tooling) which is usually rubber covered, but sometimes is metal, that has the three-dimensional mirror image of the embossing roll imposed in its surface, and (c) optimized thermal characteristics relative to the thermal characteristics of the sheet being embossed. In the polyvinyl chloride, PVC, siding industry, for example, the embossing roll is intended to create a woodgrain pattern on the vinyl siding used for housing and other building construction.

Heretofore, embossing tools in the form of a metal roll or a metal stamping tool, e.g., steel or aluminum roll or stamping tool, having a patterned embossing surface, such as a woodgrain pattern engraved in the embossing surface, were chromium electroplated to provide wear resistance. In those instances, as in the polyvinyl chloride or aluminum siding industry, where it is desirable to provide a dull, non-glossy or matte finish on the embossed (e.g. woodgrain embossed) surface, the chromium-electroplated embossing surface was blasted with grit or chemically etched to produce a rough surface by forming a multitude of tiny pits in the embossing surface. These tiny pits cause the formation of multitudinous tiny peaks over most of the embossed surface to provide a matte finish thereto and thereby disperse light hitting the embossed surface thus providing it with the non-gloss, matte finish. The resulting matte finish also is intended to hide surface imperfections in the sheet being embossed. However, the matte finish produced by chromium electroplated, grit-blasted or chemically etched embossing surfaces are relatively non-uniform and become more non-uniform as the embossing surface wears.

The conventional chromium-electroplated, grit-blasted or chemically etched embossing rolls suffer severely from lack of wear resistance and corrosion resistance particularly when contacted with thermoplastic materials, such as polyvinyl chloride, containing residual HCl or other corrosive residual chemicals. As a consequence, conventional chromium-electroplated, grit-blasted or chemically etched, embossing rolls do not last long and have to be replaced frequently. The normal life of a chrome-electroplated embossing roll used to produce vinyl siding is about 7 to about 12 months after which it must be stripped, electroplated again with chromium if the steel substrate has not been damaged and grit-blasted or chemically etched again.

Furthermore, the embossed surface heretofore produced by conventional embossing surfaces suffer from the further defect of lacking scuff-resistance. In the case of PVC siding, unsightly, shiny scuff marks are readily formed on the embossed surface when it is subjected to light to moderate impact or scraping, for example, as caused by a hammer or other object during construction, by a tennis ball hitting the embossed surface or by a rake handle sliding across the embossed surface. It is believed that this is the result of the flattening or scraping off at the contact areas of the tiny peaks formed in the surface of the PVC siding by the tiny pits in the surface of the embossing roll. Furthermore, since the chromium-electroplated embossing rolls lack sufficient wear resistance, its embossing surface smooths out relatively quickly diminishing or eliminating the pits in the embossing surface, consequently diminishing or eliminating the tiny peaks in the embossed surface resulting in increasing gloss on the embossed surface and loss of ability to hide minor surface imperfections in the sheet being embossed.

Additionally, conventional chromium-electroplated, grit blasted or chemically etched, embossing rolls produce matte finishes that differ over a relatively wide range from embossing roll to roll. As a result, it is difficult, and in some instances not possible, to produce an embossed product such as PVC siding having a consistent level of gloss when a conventional embossing roll is replaced with a fresh one or the product is produced using more than one embossing line equipped with different conventional embossing rolls. The application of PVC siding having widely different levels of gloss (or conversely widely different levels of dullness) to the same building produces an unsightly appearance and is unacceptable, particularly since a prime advantage of PVC siding is that it requires no painting or other maintenance for the lifetime of the siding.

A further defect in the use of conventional chromium-electroplated, grit-blasted or chemically etched embossing rolls in the production of woodgrain, matte-finished PVC siding or similar products is that relatively minor changes in line speed at which the PVC sheet is being embossed by the conventional embossing rolls, or relatively minor variations in the temperature of the PVC sheet or of the conventional embossing roll, causes unacceptable variations in the level of gloss (or dullness) in the final product. Extensive adjustments to the embossing pressure and coolant flow rate are then necessary whenever a change in line speed or PVC sheet temperature occurs. This results in downtime and consequent loss of productivity until the proper conditions are restored. Also, a considerable amount of PVC sheet embossed with improper gloss level until the proper conditions are restored must be discarded or reprocessed.

Embossing rolls heretofore have also been coated with grit of various sizes bonded to the surface of the embossing roll by means of an adhesive such as a synthetic plastic adhesive. This prior technique is disclosed in U.S. Pat. Nos. 3,387,351, 3,539,671, 3,619,446 and 4,250,135. The problems presented by the grit-applying techniques are that the grit is usually non-uniformly applied and can result in the alteration of the embossing pattern including the filling in by the grit and adhesive of cavities, crevices and other fine detail in the embossing surface. There is also the danger that through wear and improper application the grit will flake off or otherwise become embedded in the embossed product.

SUMMARY OF THE INVENTION

The present invention is based on the unexpected finding that a ceramic, cermet or metallic embossing surface having a three-dimensional embossing pattern is capable of (1) increasing the impact strength of thermoplastic sheets embossed therewith by as much as 30%, (2) producing a scuff-resistant and more uniform matte finish, (3) providing matte finishes having a more uniform low level of gloss (or dullness) over the full range of production line speeds and temperatures of the embossing surface and the material being embossed, (4) providing matte finishes in a narrower range of low gloss (dullness) levels from embossing surface to embossing surface of the same type, and (5) providing greatly increased wear- and corrosion resistance, when compared to embossing surfaces heretofore known. The novel embossing surfaces of this invention are covered with multitudinous tiny peaks that form multitudinous tiny indentations covering the surface embossed thereby providing an extremely uniform, wear-resistant matte finish to the embossed surface. In comparison, heretofore known embossing surfaces are covered with multitudinous tiny pits that form multitudinous tiny peaks covering the surface embossed thereby and providing a scuff-prone, relatively non-uniform matte finish to the embossed surfaces.

The present invention is also based on the discovery that the above-mentioned unexpected, desirable characteristics are provided by bonding by detonation gun, plasma torch, Jet-Kote (a hypersonic combustion spray coating apparatus), Fare-Gun, or other thermal spray process, ceramic, cermet or metallic coatings to the embossing surfaces of embossing tools, such as embossing rolls.

DETAILED DESCRIPTION OF THE INVENTION

In accordance with a preferred embodiment of this invention the embossing surface of an embossing roll, or other embossing tool such as embossing stamps having a flat or shaped embossing surface, is coated with a ceramic, cermet or metallic coating applied by a detonation gun, a plasma torch, a Jet-Kote apparatus, a Fare-Gun, or other thermal spray process. Embossing rolls and tools suitable for coating in accordance with this invention can be made of steel, aluminum, other metals, suitable plastics or any material suitable for use as an embossing tool and to which a thermal spray coating can be applied. The embossing surface prior to coating is engraved, etched, machined or otherwise treated by known techniques to provide thereon a three-dimensional embossing design. Examples of suitable methods for providing a three-dimensional embossing surface are given in U.S. Pat. Nos. 4,116,594, 4,280,978, 4,478,769 and 4,551,297. However, any suitable means for creating the embossing surface may be used. The embossing tool can be in the form of a roll having a cylindrical embossing surface adapted for embossing sheet materials such as sheets of thermoplastic, paper, metals, and textiles. The embossing tool can also be of the stamp type which are used for embossing the surfaces of shaped articles such as plastic automotive dashboards, interior door panels, arm rests, and other automotive parts, household goods such as, plastic appliance, radio and TV cabinets and furniture, ceiling and floor tiles and the like. The embossing surface is provided with any three-dimensional embossing design desired, e.g., a raised woodgrain pattern, a pebble pattern, a thatched pattern, a woven pattern, basketweave pattern or any other three-dimensional design or, in some cases, a relatively smooth uniform surface.

Any suitable ceramic, cermet or metallic coating may be applied to the embossing surface of the embossing tool according to the present invention. For example, suitable ceramic coatings include alumina, mixtures of alumina with titania, chromia, mixtures of chromia and alumina, zirconia mixed with magnesia and the like. Suitable metallic carbide coatings include tungsten carbide and mixtures and/or alloys of tungsten carbide with cobalt, nickel, chromium, iron and mixtures of such metals can be employed. In addition, titanium carbide, tungsten-titanium carbide and chromium carbide are also useful. The above-mentioned carbides can be used separately or mixed or alloyed with cobalt, chromium, tungsten, nickel, iron or other suitable metals. Other suitable cermets include mixtures of alumina with cobalt, chromium and tantalum, and mixtures of chromia with cobalt, chromium and tungsten. Suitable metallic powders for coating the embossing surface include nickel, nickel base alloys, cobalt, cobalt base alloys, chromium, chromium base alloys, iron, iron base alloys, stainless steel, alloys of copper, chromium and iron; alloys of nickel, chromium, aluminum and cobalt; alloys of cobalt, chromium, molybdenum and silicon; alloys of nickel, chromium, molybdenum and silicon; and the like. The average particle size of the ceramic, cermet and metallic particles used in this invention can range from about 1 microns to 200 microns, preferably about 5 to about 40 microns. The coarser the particle the rougher the resulting coating will be. By selecting appropriate particle sizes, an embossing surface with the requisite roughness to produce the desired matte finish can be readily produced. Before coating, it is preferred to clean the embossing surface to be coated to remove any loose dirt, scale, grease, oil or other foreign matter and to otherwise prepare the embossing surface for coating.

The ceramic, cermet or metallic coatings are applied to the embossing surface of the embossing tool by any thermal spray process, including the above-mentioned well known techniques, namely, the detonation gun process and the plasma torch coating process. The detonation gun process is well known and fully described in U.S. Pat. Nos. 2,714,563, 4,173,685 and 4,519,840, the disclosures of which are incorporated herein by reference, and involves feeding oxygen, acetylene and nitrogen into a gun barrel along with a charge of the material being coated, e.g., ceramic, cermet or metallic powder. The gas mixture is then ignited and the resulting detonation wave accelerates the powder to about 2400 ft./second while heating it close to, or above, its melting point. The maximum free-burning temperature of oxygen-acetylene mixtures occurs with about 45% acetylene and is about 3140° C. However, under detonation conditions, the temperature probably exceeds 4200° C. so that most materials can be melted by the process. The gun barrel is aimed at the substrate, i.e., the embossing surface, and the powder at or near or above its melting point is deposited on the substrate. After each firing, the gun barrel is purged with nitrogen. This cycle is repeated about 4 to 8 times a second and each pulse of powder results in the deposition of a circle of coating of about 25 mm. in diameter and a few microns thick. The total coating is produced by many overlapping circles of coatings, each of which is composed of many overlapping, thin, lenticular particles or splats corresponding to the individual powder particles. The overlapping circles are closely controlled to produce a relatively even coating.

The plasma technique for coating substrates is conventionally practiced and is described in U.S. Pat. Nos. 3,016,447, 3,914,573, 3,958,097, 4,173,685 and 4,519,840, the disclosures of all of which are incorporated herein by reference. In the plasma coating technique, a plasma torch having a copper anode and tungsten cathode is usually used. A gas such a argon or nitrogen or a mixture of these with hydrogen or helium is caused to flow around the cathode and through the anode which serves as a constricting nozzle. A direct current arc, usually initiated with a high frequency discharge, is maintained between the electrodes. The arc current and voltage used vary with the anode/cathode design, gas flow and gas composition. The power used varies from about 5 to 120 killowatts depending on the type of torch and the operating parameters.

A gas plasma is generated by the arc and contains free electrons, ionized atoms and some neutral atoms and unassociated diatomic molecules when nitrogen or hydrogen are used. Plasma gas velocities with most conventional torches are subsonic but supersonic velocities can be generated using converging or diverging nozzles with critical exit angles. The temperature of the plasma may exceed 50,000° F. A ceramic coating powder, cermet powder or a metallic carbide coating powder is introduced into the plasma stream. The coating powder melts in the plasma and is caused to impinge upon the substrate, i.e., the embossing surface. The plasma process of coating utilizes much higher temperatures than the detonation gun (or D-Gun) process and also is a continuous process whereas the D-Gun process is intermittent and non-continuous.

Other thermal spray processes which may be used include the hypersonic combustion spray coating process, "high velocity" plasma spray process, flame spray process, and Fare-Gun coating process.

The thickness of the coating applied by either the plasma process, the D-Gun process, or other processes mentioned hereinabove can range from 0.5 to 100 mils, preferably 1.5 to 30 mils, and the roughness ranges from about 25 to about 1000 microinch $R_a$ depending on the coating process, i.e., D-Gun, plasma, or other process, the process operating parameters, the type of coating material, and the thickness of the coating. One mil equals 0.001 inch and a microinch equals $10^{-6}$ inch. $R_a$ is the average surface roughness measured in microinches by ANSI Method B46.1, 1978. The higher the number, the rougher the surface.

The ceramic, cermet or metallic coating on the embossing tool may be further coated with a suitable pore sealant such as an epoxy sealant, e.g., UCAR 100 epoxy. This treatment seals the pores to prevent moisture or other corrosive materials from penetrating through the ceramic, cermet or metallic coating to attack and degrade the underlying structure which may be steel or aluminum or other corrodable material.

The resulting coated embossing tool has a ceramic, cermet or metallic coated, patterned embossing surface capable of providing a matte finish and an embossed design to an article having a surface embossable by pressure contact with the embossing surface. The embossing surface of ceramic, cermet or metallic contains an average of about 50 to 2,000 preferably 100 to 500, tiny peaks per inch (defined as peak count, $P_c$, greater than a band width of 0.01 microinch about the center line) covering the embossing surface. The tiny peaks covering the embossing surface have a maximum peak height, $R_p$, of about 100 to about 5,000, preferably about 500 to about 3,000 microinches. The coated embossing surface can be used in its as coated condition (with or without application of a sealant) in which case the maximum dullness matte finish is produced on the embossed surface. Alternatively, the embossing surface can be brushed or ground to a lesser roughness in those instances where higher gloss (less dullness) is desired in the embossed surface. In the manufacture of PVC siding and soffit, for example, it is desirable that siding and other vertical members have a gloss level of about 22 to about 35 and that soffits or other horizontal surfaces have a gloss level of about 8 to about 12, as measured on a Gardner Gloss Meter (75° angle of incidence).

The coating as applied by the detonation gun, plasma torch, or other process mentioned hereinabove, is very thin and closely conforms to the three-dimensional embossing design engraved or otherwise formed on the substrate to which the coating is applied. Since the coating is applied by impingement of powder particles from a gun or torch and does not flow substantially (as opposed to splashing or ricocheting) after striking the surface being coated, surfaces parallel to the line of impingement of the gun or torch remain uncoated or only partly coated due to splash or ricochet while surfaces perpendicular to the line of impingement are fully coated. Thus, coatings of this type tend to round off any sharp corners, internal and external, in the embossing design. For example, inside corners are filled-in somewhat forming a thin filet in the corners and the outside corners are feathered out along the edges of surfaces that are perpendicular to the line of impingement. It is believed that the resulting reduction of the sharpness of corners in the embossing design may eliminate or reduce stress points in the embossed surface where breaks tend to occur, thus increasing the impact strength of the embossed article. Regardless of the theory or mechanics by which it is obtained, the impact strength is dramatically increased through the use of a ceramic, cermet or metallic coating on the embossing surface.

The novel embossing surfaces of this invention can be used in any suitable manner to emboss the embossable surface of articles such as thermoplastic sheets and other articles as described hereinabove. Illustratively, thermoplastic sheets can be embossed in a horizontal or vertical nip embossing unit in which heat is applied, as needed, to the sheet by means of a relatively large heat drum and/or by means of arc-shaped radiant heaters and/or straight infrared heater banks. It is preferred, of course, to utilize, as much as possible, the residual heat within the thermoplastic sheet as provided by prior processing such as extrusion, calendering and/or coating of the thermoplastic sheet. Any suitable embossing equipment, embossing conditions and pretreatments and post treatments of the embossing surface, the embossable surface and the embossed surface can be utilized. Generally, the embossable surface, e.g., thermoplastic sheet, when embossed, is at a temperature at which it is deformable into the embossed design and then is cooled sufficiently to retain the embossed design. The specific process conditions depend upon the nature of the particular embossable article but are well established in the industry for many articles or can be readily determined with a minimum of trial and error. Any suitable embossing techniques and conditions currently known or available to the skilled worker can be utilized in embossing articles with the novel embossing surfaces in accordance with this invention.

The following illustrative examples are presented. All temperatures are on the Fahrenheit scale and all parts and percentages are based on weight. The coating methods used are described as follows:

Plasma Coating Method: a technique for continuously applying a ceramic, cermet or metallic coating to a substrate by injecting the ceramic, cermet or metallic powder into a plasma of ionized gas formed by establishing an electric arc across a stream of inert gas, specifically argon. A ceramic or metallic powder is continuously fed to the plasma which may be operating at a temperature as high as 50,000° F. The powder is heated and accelerated with the expanding gases in the plasma and is directed against the substrate where the powder cools, congeals and bonds to the substrate.

D-Gun Coating Method: a detonation gun method of applying a ceramic, cermet or metallic coating to a substrate in which the ceramic, cermet or metallic powder is charged to a gun barrel with nitrogen, oxygen and acetylene which is detonated to produce a temperature of about 6000° F. which melts the ceramic, cermet or metallic powder and propels it against the substrate.

EXAMPLE 1

A steel roll having a diameter of 12 inches, a roll face 18 inches long and a woodgrain pattern engraved on its roll face was degreased and otherwise prepared for coating with ceramic, i.e., aluminum oxide (UCAR LA-2-400, Union Carbide Corporation). Using a detonation gun operating at a temperature of about 7,000° F., an aluminum oxide coating about 0.004 to about 0.006 inch thick was bonded to the outer cylindrical, woodgrain-engraved, roll face of the steel roll. The detonation gun was aimed radially at the cylindrical woodgrain embossing surface of said roll which was moved horizontally and rotationally until the entire cylindrical embossing surface was coated with the specified thickness of aluminum oxide coating.

The resulting ceramic coated woodgrain patterned roll was used on a production scale to emboss polyvinyl chloride, PVC, sheets used in the production of vinyl siding for buildings. During embossing the PVC sheet was at a temperature of about 370° F. to 410° F. and the embossing roll was maintained at a temperature of about 100° F. by circulating cooling water through said roll. The embossing roll formed a nip with a rubber faced back-up roll through which the PVC sheet passed. The thickness of the PVC sheet was 37 mils. The PVC sheet passed through the nip and was thereafter cooled sufficiently to hold the embossed woodgrain design imposed by the embossing roll. The aluminum oxide ceramic coating far outlasted similar rolls electroplated with chromium which wear out faster. The aluminum oxide coated roll was substantially impervious to corrosion whereas the conventional chromium plated roll are not.

The reflectance or gloss of the surfaces of the PVC sheet embossed with the ceramic coated roll was much more uniform and lower than that produced by conventional chromium-plated rolls. Moreover, the range of gloss of the PVC sheet produced with 10 similar aluminum oxide coated rolls, measured with a Gardner Gloss Meter, was much narrower, 25-30, than with 10 conventional chromium-electroplated rolls, 22-35.

In addition, the PVC sheet embossed by the aluminum oxide coated roll surprisingly had a substantially greater, about 30% greater, impact strength compared to PVC sheet embossed by conventional chromium-plated rolls as measured by the Gardner Dart drop test using an eight lb. weight with a 0.5 inch radius on its end. This permitted a 30% reduction in sheet thickness or the reduction or elimination of impact modifier in the PVC without reducing impact strength, thereby allowing as much as a 30% reduction in materials cost.

The PVC sheet embossed by the aluminum oxide coated roll surprisingly exhibited a much higher resistance to burnishing, i.e. surface scuffing, leaving a shiny or glossy scuff mark, as compared to PVC sheet embossed by conventional chromium-plated embossing rolls.

These results are surprising and unexpected because the sharp indentations formed all over the embossed PVC sheet surface by the ceramic coating would be expected to reduce rather than increase the impact resistance of the PVC sheet. It is also surprising that a surface that is characterized predominantly by tiny indentations rather than the tiny peaks provided by conventional chromium-plated embossing rolls would provide the desired extremely uniform matte finish.

Another unexpected, desirable characteristic was the fact that the level of gloss resulting from use of this roll was found to be much less dependent on line speed and PVC, or roll, temperature over the full range of production line speeds and temperatures. By comparison, conventional chromium-electroplated rolls require extensive adjustment of roll pressure and coolant whenever a change in the line speed or PVC sheet temperature is made with concommitent down-time and consequent loss in productivity and material.

EXAMPLE 2

A steel roll similar to that described in Example 1 was coated with a plasma-deposited aluminum oxide coating (UCAR LA-6) having a thickness of about 4 to about 6 mils. The surface roughness of the resulting coated embossing roll was approximately 90-110 $R_a$. The resulting coated embossing roll when used to emboss PVC siding produces an embossed siding having gloss levels comparable with those provided by the conventional grit-blasted, chromium-electroplated embossing rolls. The embossing roll made according to this example, however, is wear- and corrosion-resistant, is much longer lived and produces a more uniform and scuff-resistant matte finish over a much longer period of use than the conventional grit-blasted, chromium-electroplated embossing rolls.

What is claimed is:

1. A wear-resistant,-pressure contact embossing tool having an embossing surface formed with an embossing pattern for providing a matte finish and an embossed design to an article having a surface embossable by pressure contact therewith, said embossing surface having a ceramic, cermet or metallic coating bonded thereto by a thermal spray process, wherein the external surface of said coating generally conforms to said embossing pattern and contains an average of about 50 to 2,000 peaks per inch covering said external surface of said coating, whereby said peaks indent the embossable surface of said article when pressure contacted with the external surface of said coating to provide the embossable surface of said article with a matte finish and said embossing surface provides an embossed design thereto.

2. Embossing tool as claimed in claim 1 wherein said peaks covering the external surface of said coating have a maximum peak height of about 100 to about 5,000 microinches.

3. Embossing tool as claimed in claim 1 wherein said peaks covering the external surface of said coating have a maximum peak height of about 500 to about 3,000 microinches.

4. Embossing tool as claimed in claim 3 wherein said coating has a nominal thickness of about 1.5 to about 30 mils.

5. Embossing tool as claimed in claim 4 wherein said tool is in the shape of an embossing roll having a cylindrical patterned embossing surface.

6. Embossing tool as claimed in claim 4 wherein said tool is in the form of an impression stamp having a flat or shaped patterned embossing surface.

7. Embossing tool as claimed in claim 4 wherein said coating is aluminum oxide applied by a detonation gun.

8. Embossing tool as claimed in claim 4 wherein said coating is aluminum oxide applied by a plasma torch.

9. Embossing tool as claimed in claim 4 wherein said embossing surface is provided with a woodgrain design for imparting a woodgrain design to said article.

* * * * *